June 8, 1965  E. J. PETERSEN  3,188,628
SYNTHETIC VIDEO GENERATOR
Filed March 25, 1963
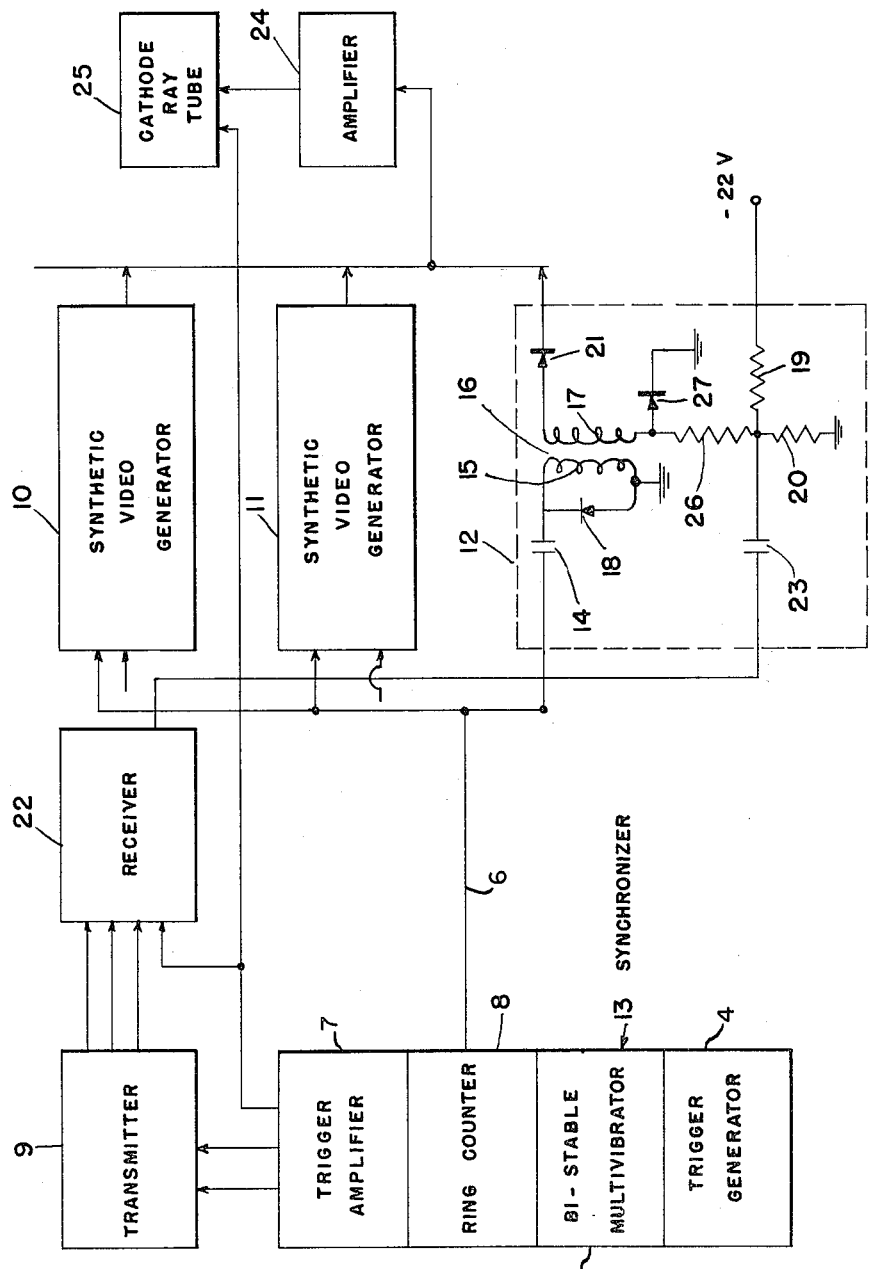
INVENTOR.
EARL J. PETERSEN
BY Harry M. Saragovitz,
Edward J. Kelly,
Herbert Berl & J. Dubroff
ATTORNEYS

3,188,628
SYNTHETIC VIDEO GENERATOR
Earl J. Petersen, Bountiful, Utah, assignor, by mesne assignments, to the United States of America as represented by the Secretary of the Army
Filed Mar. 25, 1963, Ser. No. 267,872
3 Claims. (Cl. 343—5)

This invention relates to radar systems of the type wherein a cathode ray tube is utilized to provide a display indicative of the position of a distant object or target. Operation of previous systems of this type has involved the difficulty that the displays are not sufficiently bright in the case of small targets. The present invention avoids this difficulty by the provision of a circuit network which operates to make all the displays of equal brightness. This circuit network is hereinafter called a synthetic video generator. As will appear this generator has two inputs. The first of these inputs is derived from a ring counter which is one element of the radar synchronizer. This first input puts the generator in a condition such that it will respond to the second input which is delivered from the radar receiver.

The invention will be better understood from the following description when considered in connection with the accompanying drawing and its scope is indicated by the appended claims.

The single figure of the drawing illustrates only so much of a radar system as is essential to an understanding of its relation to the invention. This system includes a transmitter 9 which functions, in response to trigger pulses applied from a synchronizer 13, to radiate pulses of high frequency energy. The synchronizer 13 includes a source of trigger pulses such as a pulse generator indicated by the block 4, providing signal pulses at any desired frequency rate, such as 10 kc. per second, for example, a bistable multi-vibrator 5 and ring counter means 8 coupled thereto for providing, in synchronism, control pulses of constant amplitude generally at a higher frequency rate such as 1 mc. per second for example, a counter output circuit lead 6, and a trigger pulse amplifier 7 for the trigger pulses applied to the transmitter from the generator 4. These pulses are reflected from a distant object and received by a receiver 22. From the synchronizer 13, trigger or timing pulses are also applied to the receiver 22 and a cathode ray tube 25 to gate them in synchronism with the transmitter. These various parts of the radar system are, of course, well known to those skilled in the art.

The present invention relates to the provision of means for making the displays of the cathode ray tube 25 of equal brightness for large and small targets. To this end, there are provided one or more synthetic video generators as indicated at 10, 11 and 12, the generator 12 being shown in the form of a wiring diagram. The other generators 10 and 11 are shown only to indicate that other similar signal channels may be connected to the same display tube. Normally the system includes only the generator 12, for example.

Control pulses are delivered from the ring counter 8 of the synchronizer 13 through the lead 6 and a capacitor 14 to the primary winding 15 of a pulse transformer 16. These pulses are differentiated by the capacitor 14 and transformer 16 to provide at the secondary winding 17 a series of positive pulses of constant amplitude. Negative pulses are also formed but are clipped by a diode 18.

The D.C. output voltage level of the transformer 16 is determined by a voltage divider 19-20 to which a voltage of −22 v. is applied, the secondary winding 17 being connected through a resistor 26 to the junction of the resistors 19 and 20 of the voltage divider. This keeps the generator output diode 21 biased off so long as no signal pulse is applied from the receiver 22 through a capacitor 23.

When a pulse is transmitted from the receiver 22, however, a positive pulse is applied at the junction between resistors 19 and 20 and the output diode 21 is biased on. Thereupon, the differentiated constant amplitude positive pulses from the ring counter appearing at the secondary 17 are gated to an amplifier 24 which delivers its output to a cathode ray tube 25. As a result this tube produces a display of equal brightness which is indicative of the position of the object from which the transmitted pulse was reflected regardless of size. In order to prevent the pulse received from the target from exceeding ground potential, it is clipped by a clipping circuit consisting of the resistor 26 and a diode 27.

What the invention thus provides is an electronic circuit which functions to gate constant amplitude fixed polarity video pulses during intervals of target detection, thus allowing cathode-ray-tube displays to be of constant brightness for both large and small targets. The diodes 18 and 27 may be of the 1N127 type, and the diode 21 of the 1N659 type. A suitable value for the capacitor 23 is 20 mfd. and a suitable value for the resistors 19 and 20 is 27K.

I claim:
1. In a circuit for operating a cathode-ray tube to provide displays of equal brightness in response to pulses reflected from large and small radar targets, the combination with said tube of an output diode, means connecting said diode to a control electrode of said tube, means providing a source of synchronized control pulses, means for differentiating and clipping said control pulses to apply to said output diode gating pulses of constant amplitude and fixed polarity, means for maintaining said gating pulses at a direct-current level insufficient to conduct current through said diode, and means for applying said target-reflected pulses to said direct-current level maintaining means with a polarity raising said direct-current level to a value at which said output diode conducts said gating pulses to said control electrode for display on said cathode-ray tube.

2. In a circuit for operating a cathode-ray tube to provide displays of equal brightness in response to pulses reflected from large and small radar targets, the combination with said tube of an output diode, means connecting said diode to a control electrode of said tube, means providing a source of synchronized control pulses, means for applying control pulses from said source to said output diode including a coupling transformer having a secondary winding connected with said diode and a primary winding connected with said source to provide control pulses therefrom, means for differentiating and clipping said control pulses to apply to said output diode gating pulses of constant amplitude and fixed polarity, said last-named means including a coupling capacitor connected serially in circuit with the primary winding and its inductance and a second diode connected in parallel relation with the primary winding means for maintaining said gating pulses at a direct-current level insufficient to conduct current through said output diode, said last-named means including a voltage divider connected in circuit with the secondary winding at the low signal potential end thereof to apply a cut-off biasing voltage therethrough to said output diode from an intermediate tap-point thereon, means for applying said target-reflected pulses to said direct-current level maintaining means at said divider intermediate tap point with a polarity raising said direct-current biasing level to a value at which said diode conducts said gating pulses to said control electrode.

3. In a circuit for operating a cathode-ray tube to provide displays of equal brightness in response to pulses reflected from large and small radar targets, the combination as defined in claim 2, wherein means are provided for maintaining the target reflected pulses applied to said divider tap point below a predetermined level comprising a diode connected to the transformer secondary, in the same polarity relation thereto as the output diode, at said low signal potential end thereof.

References Cited by the Examiner
UNITED STATES PATENTS

| | | | |
|---|---|---|---|
| 2,944,253 | 7/60 | Covely | 343—5 |
| 3,048,713 | 8/62 | Tellerman et al. | 328—94 |
| 3,048,717 | 8/62 | Jenkins | 307—88.5–5 |
| 3,053,995 | 9/62 | Hallberg | 307—88.5–3.8 |

CHESTER L. JUSTUS, *Primary Examiner*.